May 2, 1967
L. D. THOMAS ETAL
3,317,294
GLASS POLISHING COMPOSITION COMPRISING A
WATER-SOLUBLE ZINC SALT
Filed July 16, 1964
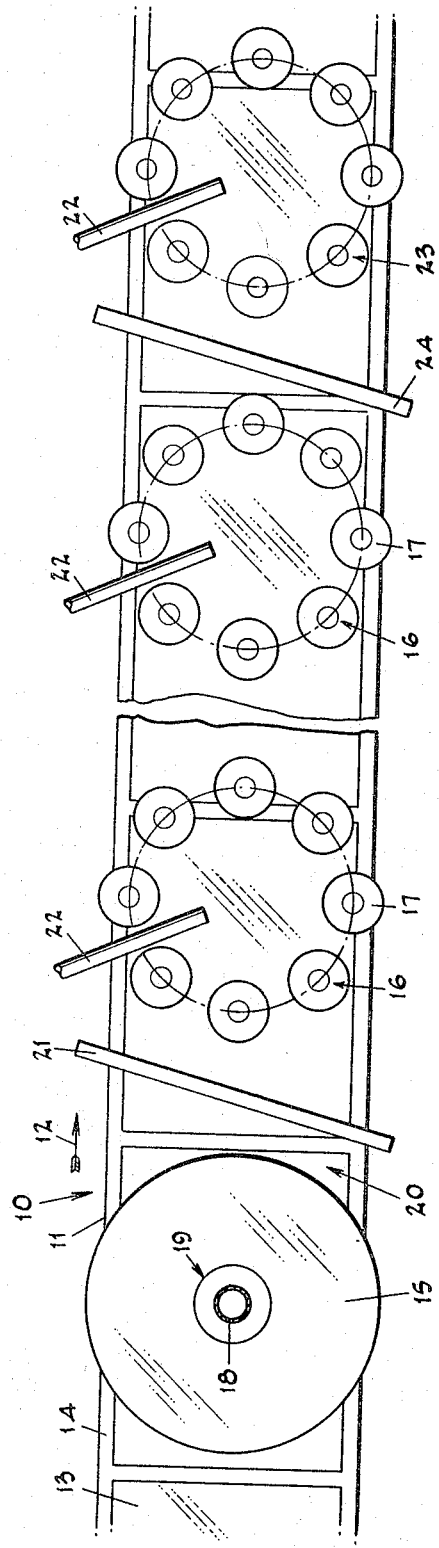
INVENTORS
Lazarus D. Thomas and
BY Harold L. Queter
Nobbe & Swope
ATTORNEYS

United States Patent Office 3,317,294
Patented May 2, 1967

3,317,294
GLASS POLISHING COMPOSITION COMPRISING A WATER-SOLUBLE ZINC SALT
Lazarus D. Thomas, Maumee, and Harold L. Reuter, Toledo, Ohio, assignors to Libbey-Owens-Ford Glass Company, Toledo, Ohio, a corporation of Ohio
Filed July 16, 1964, Ser. No. 383,023
15 Claims. (Cl. 51—307)

The present invention relates broadly to the surfacing of glass and more particularly to novel methods and compositions for polishing the previously ground surfaces of plate glass ribbons or blanks.

As is well known, plate glass is usually produced commercially by first forming a more or less continuous ribbon from a mass of molten glass and then surfacing one or both sides thereof while the glass, either as a ribbon or as individual blanks that have been cut therefrom, is moved continuously along a predetermined path. During such surfacing the glass is passed first through a grinding area and then through a polishing area. In the grinding area, at least one surface is subjected to the abrasive action of sand of progressively decreasing coarseness under heavy iron runners; and in the polishing area the previously ground surface or surfaces are polished with rouge under relatively soft pads such as wool or hair felt.

This polishing with rouge (iron oxide) in a water slurry and with copperas added, has been practiced in the plate glass industry for a great many years and, until very recently, it has remained the conventional and most generally accepted method of polishing previously ground plate glass blanks although various other polishing materials and mixtures have been suggested and tried from time to time in an effort to obtain faster and/or better controlled polishing.

For example cerium oxide, which is well known as a polishing agent in the optical glass industry, received considerable attention but did not initially appear applicable to the commercial polishing of plate glass; first, because of its relatively high cost as compared with iron oxide; second, because it often produced a dull surface effect on the finished glass by reason of a characteristically cloudy film which it left and which, once formed, was very difficult to remove; and, third, because its polishing rate was not particularly high.

However we have found that, by the use of a special additive, a novel polishing composition can be formulated, with cerium oxide as a principal ingredient, that will give notably improved results in the final finishing of plate glass.

The special additive is a zinc salt and it may be used alone, or with other additives, to improve the action of cerium oxide and also of other known polishing agents including rouge.

In laboratory polishing tests, conducted with ground plate glass blanks and using conventional hair felt polishing tools, we have found that the compositions of this invention are capable of polishing approximately one and one-half times as fast as the conventional rouge-copperas-water slurry under the same conditions and that, at the same time, they will produce a bright, clear and highly transparent polished surface of notably improved finish. Moreover they can be used as wet polishing mediums at the end of a commercial plate glass polishing line without forming objectionable amounts of "drag" or "orange-peel." Consequently they produce several times the polishing work of rouge in this location where the rouge must be used dry to minimize the formation of the "drag."

It is therefore a primary object of this invention to provide a novel method of polishing plate glass blanks that will give an improved finish in a shorter time than has heretofore been considered possible.

Another object is the provision for use in such a method of a novel and improved composition of polishing materials.

Another object is to provide an additive material that will overcome the defects and improve the polishing action of water slurries of conventional polishing agents such as rouge, cerium oxide and the like.

Another object is the provision of an additive of this character that is not only cheaper than prior known additives but that can be used in smaller amounts to give better results.

Still another object is to provide improved polishing of previously ground plate glass blank surfaces with conventional soft polishing tools and a special slurry or polishing compound made up essentially of cerium oxide, a zinc salt and water.

Further objects and advantages of the invention will become more apparent during the course of the following description when taken in connection with the accompanying drawing.

In the drawing, wherein like numerals are employed to designate like parts throughout the same:

The single figure is a fragmentary, diagrammatic, plan view of one type of continuous grinding and polishing line upon which the method of the invention may be practiced.

Referring now more particularly to the drawing, there is designated generally by the numeral 10 a conventional type of plate glass grinding and polishing line that is made up of a series of tables 11 mounted for continuous horizontal movement in the direction of the arrow 12 and adapted to receive a series of plate glass blanks 13 arranged in end-to-end relation and embedded in a layer of plaster 14 on the tables.

As the tables 11 are moved forwardly, the glass sheets carried thereby will be moved, first beneath a series of rotating grinding tools 15, and then beneath a series of rotating polishing runners 16 each of which includes a plurality of felt covered polishing tools 17 mounted for independent rotary movement on their own axes.

During passage of the glass sheets beneath the grinding tools 15 they are subjected to the grinding action of a mixture of sand and water that is fed between the tools and the glass through a conduit 18 in the shaft 19 of each tool; and, as the glass passes through the area 20, between the grinding runners 15 and the polishing runners 16, the sand and water employed during the grinding action is removed from the glass surface by means of suitable squeegees 21 or the like. During subsequent passage beneath the polishing tools 16, the glass is polished by the action of the polishing slurry of the invention which is fed onto the glass surface and between the polishing tools and the glass in any suitable manner, such as by means of pipes or hoses 22. The slurries of this invention may be emloyed throughout the polishing section of the line or they may be used only as a wet polishing medium under runners 23 at the end of a rouge polishing section. As indicated above the slurries of the invention have a distinct advantage over rouge at this location because the rouge must be used dry with a corresponding loss of efficiency. However, when both rouge and cerium oxide are used on the same line, care must be taken to avoid contamination of the latter by the former, for example by the use of squeegees as shown at 24.

Generally speaking, the principal requirement for the additive in the special polishing oxide-water slurry is that it be or include a salt of zinc as the principal ingredient. To date our most extensive experimental work has been done with zinc chloride and zinc sulfate but all of the commercially available water soluble zinc salts tried, and which include zinc nitrate, zinc bromide, zinc acetate and zinc fluoride, have given notably improved polishing action.

In the continuous polishing of plate glass, our best work has been with a relatively dilute slurry made up with 100 parts by weight of water, from 1 to 10 parts cerium or other polishing oxide and from .3 to 3 parts of the zinc salt. However, for all-around use excellent results may be had with a composition made up of 100 parts by weight of water, from 1 to 60 parts of polishing oxide and from .2 to 5 parts of the zinc salt.

Surprisingly enough we have found that the presence of the zinc salt as an additive in the indicated amounts notably improves the normal polishing efficiency of either cerium oxide or rouge in a water slurry. Moreover, it prevents formation of the cloudy film that has heretofore presented a problem when cerium oxide was employed in the dilute slurries that have to be used for production line polishing of plate glass blanks; it alleviates problems of "drag" and "orange-peel" that would otherwise arise under these conditions; and it stabilizes the polishing action.

In the following Example I there is listed a preferred composition for the special polishing slurry of the invention employing zinc chloride alone as the additive; and, in Example II, a preferred composition employing a mixture of zinc sulfate and rare earth nitrates as the additive:

Example I

| | | |
|---|---|---|
| Water | gals | 500 |
| Cerium oxide | lbs | 250 |
| Zinc chloride | lbs | 20 |

Example II

| | | |
|---|---|---|
| Water | gals | 500 |
| Cerium oxide | lbs | 250 |
| Cerous nitrate | lbs | 40 |
| Zinc sulfate | lbs | 40 |

In a series of laboratory tests comparing the polishing action of standard cerium oxide and rouge slurries with a variety of compositions made up according to the present invention under identical conditions, the compositions of the invention produced finishes between 0.3 and 2.1 (Louviaux grade) against finishes between 4.0 and 6.0 Louviaux grade) produced by the standard slurries.

A more exact report of these tests is set forth in the table below:

| Polishing Agent | Pounds | Additive | Pounds | Finish (Louviaux grade) |
|---|---|---|---|---|
| Cerium oxide | 250 | None | | 4.0 to 6.0 |
| Rouge | 250 | None | | 4.0 to 5.0 |
| Do | 250 | Copperas | 50 | 3.7 |
| Cerium oxide | 125 | $ZnCl_2$ | 40 | 2.1 |
| Do | 250 | $ZnCl_2$ | 40 | 1.7 |
| Do | 250 | $ZnCl_2$ | 20 | 1.4 |
| Do | 250 | $ZnCl_2$ | 13⅓ | 1.6 |
| Do | 250 | $Ce(NO_3)_3$ | 40 | 0.7 |
| | | $ZnCl_2$ | 13⅓ | |
| Do | 250 | $RENO_3$ | 40 | 1.1 |
| | | $ZnCl_2$ | 13⅓ | |
| Do | 125 | RECl | 40 | 1.4 |
| | | $ZnCl_2$ | 40 | |
| Do | 250 | RECl | 40 | 0.7 |
| | | $ZnCl_2$ | 20 | |
| Do | 250 | RECl | 40 | 1.0 |
| | | $ZnCl_2$ | 13⅓ | |
| Do | 250 | $ZnSO_4$ | 40 | 1.2 |
| Do | 250 | $Ce(NO_3)_3$ | 40 | 0.3 |
| | | $ZnSO_4$ | 40 | |
| Do | 125 | RECl | 40 | 1.7 |
| | | $ZnSO_4$ | 20 | |

NOTE 1.—All amounts are per 500 gallons of water.
NOTE 2.—In compiling the above table from the laboratory tests the absolute value of finish given is an average obtained from several separate tests and the variation in any single test from the average may be as large as 0.5 grade (Louviaux).

It will be appreciated that the above table only includes examples of the results obtained with two zinc salts, employed alone and in various amounts and with other additives. However, these are believed to be fully illustrative of the invention and suggestive of various effective modifications within its scope.

In fact, it is to be understood that the forms of the invention herewith shown and described are to be taken as illustrative embodiments only of the same, and that various changes in the number, order of addition and character of ingredients, as well as various procedural changes may be resorted to without departing from the spirt of the invention as defined in the subjoined claims.

We claim:

1. A method of treating a glass surface to finish the same which consists essentially in rubbing a slurry of water, a polishing oxide selected from the group consisting of cerium oxide and iron oxide, and a polishing additive comprising a water soluble zinc salt in substantially the following proportions:

| | Parts |
|---|---|
| Water | 100 |
| Polishing oxide | 1 to 60 |
| Polishing additive | .2 to 5 | over said surface with a soft tool.

2. A method as defined in claim 1, in which the polishing oxide is cerium oxide and the zinc salt is zinc chloride.

3. A method as defined in claim 1, in which the polishing oxide is cerium oxide and the zinc salt is zinc sulphate.

4. A method as defined in claim 1 in which said additive consists essentially of a water soluble zinc salt and cerous nitrate.

5. A method as defined in claim 1 in which said additive consists essentially of a water soluble zinc salt and cerous chloride.

6. In a continuous method of finishing a ground surface of a plate glass blank, the steps of moving said surface along a fixed path and during said movement rubbing said ground surface with a slurry of water, a polishing oxide selected from the group consisting of cerium oxide and iron oxide and water soluble zinc salt in proportions of 100 parts by weight of water to from 1 to 10 parts of the polishing oxide and from .3 to 3 parts by weight of the zinc salt over said surface with a relatively soft tool.

7. In a continuous method of finishing a ground surface of a plate glass blank, the steps of moving said surface along a fixed path and during said movement rubbing said ground surface with a slurry of water, cerium oxide and zinc chloride in proportions of 100 parts by weight of water to from 1 to 10 parts cerium oxide and from .3 to 3 parts by weight of the zinc salt over said surface with a relatively soft tool.

8. A method as defined in claim 6 in which the ingredients of the slurry are used in the following proportions:

| | Pounds |
|---|---|
| Water | 500 |
| Polishing oxide | 250 |
| Zinc salt | 13⅓ to 40 |

9. In a method of finishing a glass surface, the step of rubbing a slurry consisting essentially of water, cerium oxide and zinc chloride in approximately the following proportions:

| | Pounds |
|---|---|
| Water | 500 |
| Cerium oxide | 250 |
| Zinc chloride | 20 | over said surface with a soft tool.

10. In a method of finishing a glass surface, the step of rubbing a slurry consisting essentially of water, cerium oxide and additives in approximately the following proportions:

| | Pounds |
|---|---|
| Water | 500 |
| Cerium oxide | 250 |
| $Ce(NO_3)_3$ | 40 |
| $ZnSO_4$ | 13⅓ to 40 | over said surface with a soft tool.

11. A composition for use in polishing glass consisting essentially of 100 parts by weight of water, from 1 to 60 parts by weight of a polishing oxide selected from the group consisting of cerium oxide and iron oxide and from .2 to 5 parts by weight of polishing additive comprising a water soluble zinc salt.

12. A composition for use in polishing rough ground plate glass surfaces consisting essentially of water, cerium oxide and a polishing additive comprising zinc chloride in substantially the following proportions:

| | Pounds |
|---|---|
| Water | 500 |
| Cerium oxide | 250 |
| Zinc chloride | 13⅓ to 40 |

13. A composition for use as a polishing additive consisting essentially of a water soluble zinc salt and a compound of cerium and in which the ratio of zinc salt to cerium compound is between 1/3:1 and 1:1.

14. A composition as defined in claim 13 in which the zinc salt is zinc sulphate and the cerium compound is cerous nitrate.

15. A composition as defined in claim 13 in which the zinc salt is zinc chloride and the cerium compound is cerous chloride.

References Cited by the Examiner

UNITED STATES PATENTS

| 2,399,237 | 4/1946 | Maloney | 51—308 |
| 2,967,096 | 1/1961 | Kroner | 51—307 |
| 3,097,083 | 7/1963 | Silvernail | 51—309 |
| 3,158,971 | 12/1964 | Best | 51—309 |

ALEXANDER H. BRODMERKEL, *Primary Examiner.*

D. J. ARNOLD, *Assistant Examiner.*